Aug. 14, 1962 A. MARLO 3,048,896
CENTRIFUGAL ROTATIONAL MOLDING METHOD
Filed May 26, 1959
5 Sheets-Sheet 1
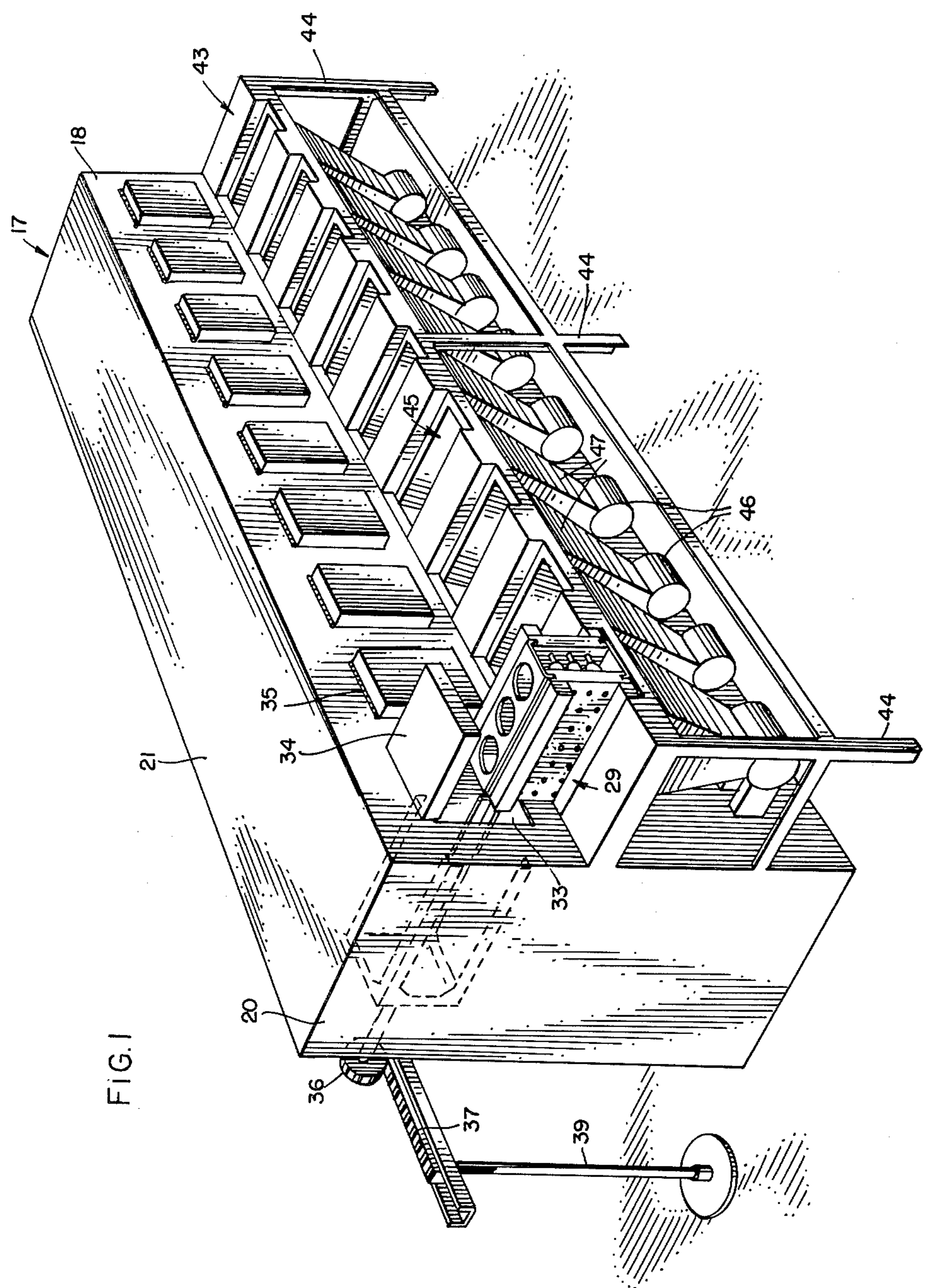
INVENTOR:
ARVID MARLO
BY
Marzall, Johnston, Cook & Root
ATT'YS CENTRIFUGAL ROTATIONAL MOLDING METHOD
Filed May 26, 1959
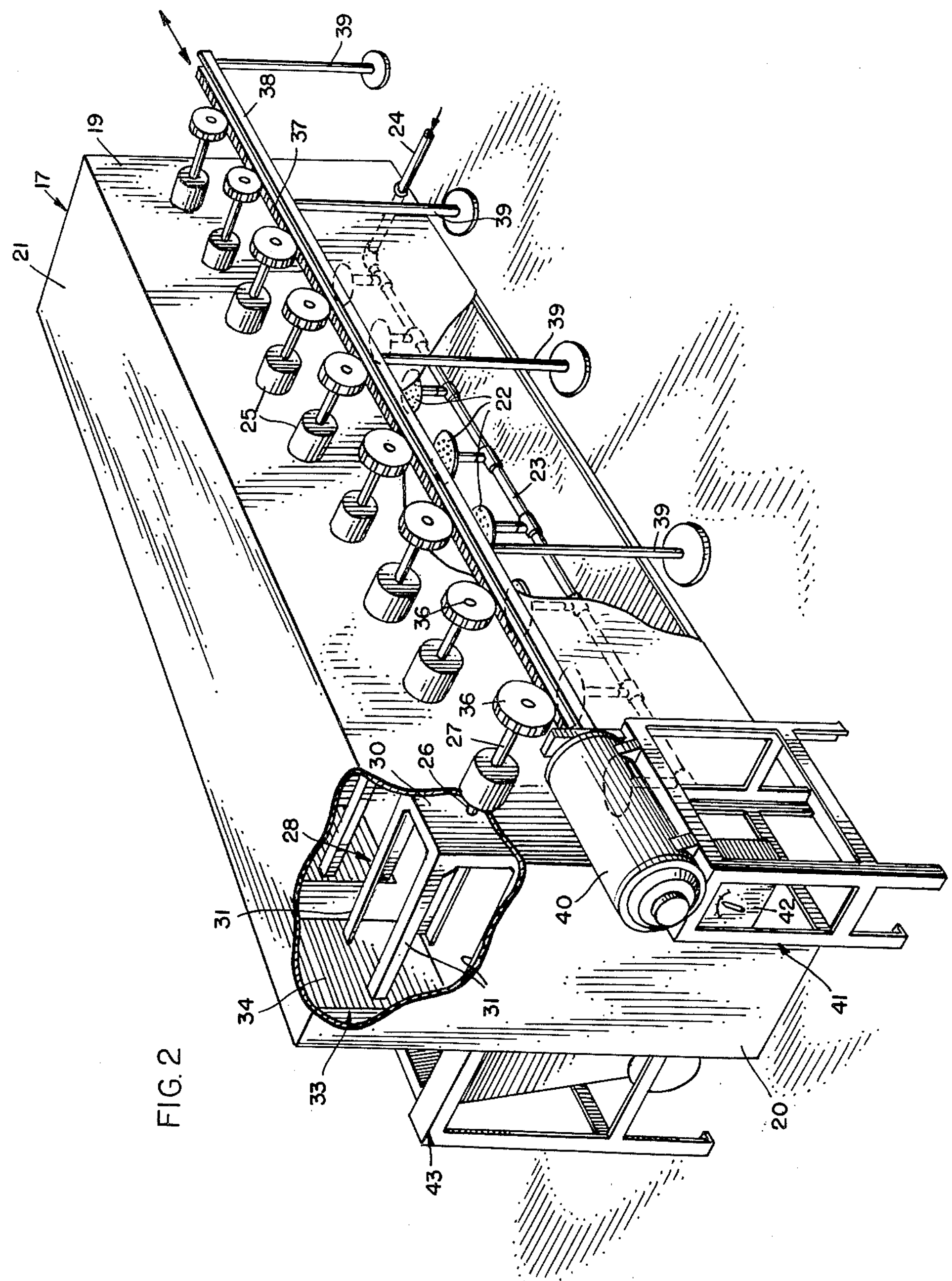
INVENTOR:
ARVID MARLO
BY
Marzall, Johnston, Cook + Root
ATT'YS Aug. 14, 1962 A. MARLO 3,048,896
CENTRIFUGAL ROTATIONAL MOLDING METHOD
Filed May 26, 1959
5 Sheets-Sheet 3
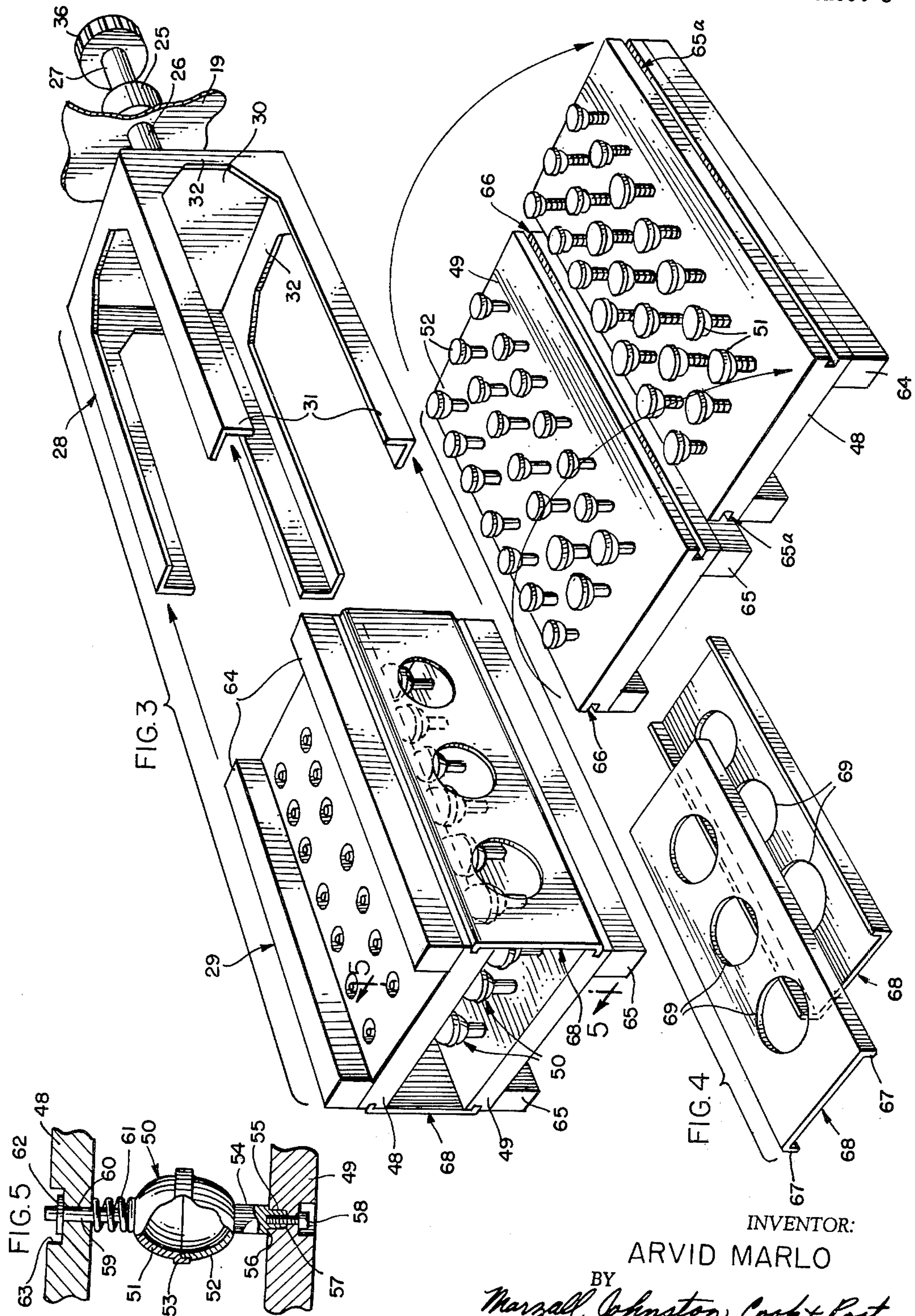
INVENTOR:
ARVID MARLO
BY Marzall, Johnston, Cook & Root
ATT'YS

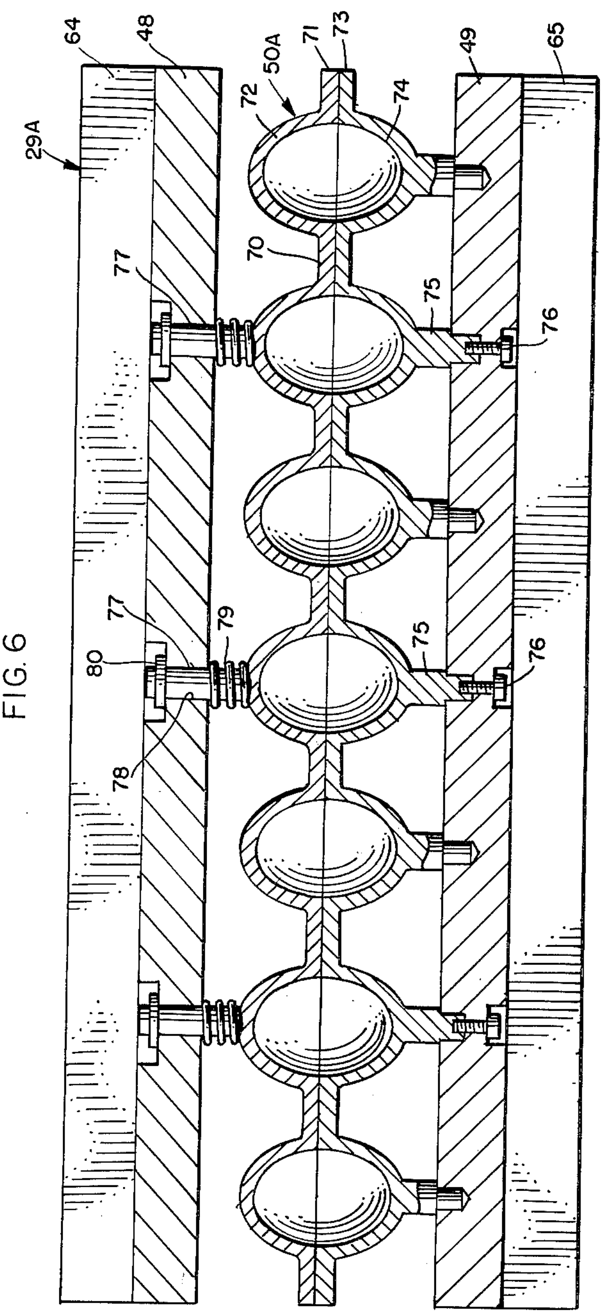
INVENTOR:
ARVID MARLO
BY
Marzall, Johnston, Cook & Root
ATT'YS

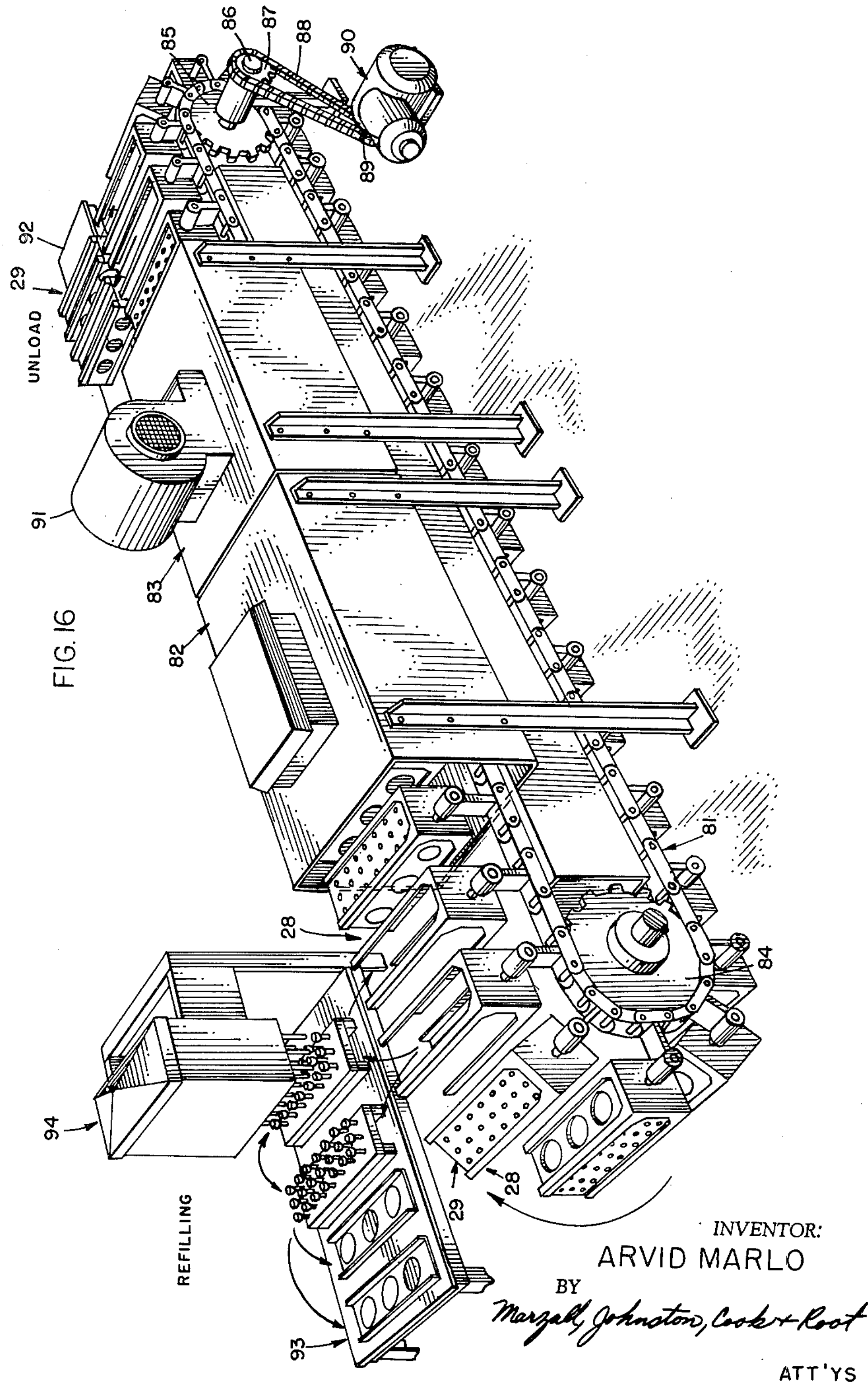
INVENTOR:
ARVID MARLO
BY
Marzall, Johnston, Cook & Root
ATT'YS

United States Patent Office 3,048,896

Patented Aug. 14, 1962

3,048,896

CENTRIFUGAL ROTATIONAL MOLDING METHOD

Arvid Marlo, 1150 Lake Shore Drive, Chicago, Ill.

Filed May 26, 1959, Ser. No. 815,974
5 Claims. (Cl. 18—58.3)

This invention relates in general to a centrifugal rotational molding method, and more particularly to a method for producing hollow articles from a thermo-setting plastic.

Heretofore, apparatus for molding hollow plastic articles has been complex in structure, which increased the maintenance requirements, and which necessitated an expensive machine. Further, all molding machines heretofore of this type have rotated the molds on divergent axes during curing of the moldable material. Still further, the machines heretofore had a limited capacity which resulted in the production of a relatively expensive product.

Accordingly, it is an object of this invention to obviate the above-named difficulties, and to provide a new and improved method of producing hollow plastic articles.

Still another object of this invention is in the provision of a method for producing hollow articles from a thermo-setting plastic which includes the steps of rotating the molds about a single horizontal axis through 180° revolutions and maintaining the mold quiescent between revolutions for a predetermined period of time.

Other objects, features, and advantages of the invention will be apparent from the following detailed disclosure, taken in conjunction with the accompanying sheets of drawings, wherein like reference numerals refer to like parts, in which:

FIG. 1 is a front perspective view of the apparatus for molding articles according to the present invention;

FIG. 2 is a rear perspective view of the apparatus of FIG. 1;

FIG. 3 is a view showing a molding unit according to the present invention and how it may be associated with the carriages or racks of the molding apparatus of FIGS. 1 and 2;

FIG. 4 is a perspective view of the molding unit of FIG. 3 and illustrating the molding unit and the locking bars in open position;

FIG. 5 is an enlarged transverse sectional view of a mold, taken substantially along line 5—5 of FIG. 3;

FIG. 6 is an enlarged transverse sectional view taken through a modified mold according to the present invention;

FIGS. 7 to 15 are sectional views taken through molds and illustrating the steps in performing the method of molding to produce hollow plastic articles according to the present invention; and FIG. 16 is a perspective view of a modified apparatus for molding hollow plastic articles wherein the carriages for supporting the molding units are carried on an endless conveyor.

Referring now to FIGS. 1 and 2, particularly, the centrifugal rotational molding apparatus for the present invention includes an oven 17 having front and back walls 18 and 19, respectively, side or end walls 20, 20, and a top wall 21. A bottom may or may not be provided for the oven, inasmuch as the floor upon which the oven would set would define a bottom. The oven is heated by a plurality of longitudinally spaced fuel burners 22 arranged along the lower portion of the oven and interiorly thereof, as seen in FIG. 2. These fuel burners are attached to a common fuel line 23 which connects to a line 24 extending from the oven and leading to a source of fuel supply. It may be appreciated that other types of heating elements may be provided without varying the scope of the present invention.

Adjacent the upper end of the oven, and mounted in the back wall 19 are a plurality of longitudinally spaced bearing members 25, each of which rotatably supports a shaft having one end 26 extending into the interior of the oven and the other end 27 extending externally of the oven. All of the shafts are arranged along a single horizontal plane.

A rack or carriage, generally designated by the numeral 28, is cantileverly supported by the shaft end 26 within the oven. The racks are adapted to removably receive a molding unit 29, FIGS. 1 and 3. Each rack includes a solid back wall 30 having extending from the four corners thereof angle irons 31 which are rectangularly spaced and arranged to define an open framework for slidably receiving a molding unit 29. The angle irons 31 extend parallel to each other and substantially perpendicular to the back wall 30. The length of the angle irons 31 is determined by the distance between the front and back walls 18 and 19, respectively, of the oven. The longitudinal axes of the racks 28 extend substantially perpendicular to the longitudinal axis of the oven 17. Flanges 32 project substantially perpendicularly from the back wall 30 of each rack 28 and are arranged between the angle irons 31 in order to enhance the strength of the racks. Thus, a molding unit 29 may be easily slidably inserted into the open end of a rack 28, and removed therefrom.

Opposite the open end of each rack 28 is an opening 33 in the front wall 18 provided access to insertion and withdrawal of the molding units 29 from the oven and racks. Each opening is normally covered by a door 34 hingedly secured to the front wall at its upper end and at the upper end of the opening at 35. Thus, the doors 34 swing outwardly and upwardly to uncover the openings 33. Any suitable means may be provided for holding the doors 34 in the opening position while manipulating a molding unit 29 through the opening.

The shaft ends 27 which extend externally of the oven have secured thereon adjacent their very ends pinion gears 36. All of the pinion gears are in engagement with an elongated rack gear 37 slidably supported along an elongated guide channel 38. The guide channel 38 is supported by a plurality of upstanding standards 39 which support the guide channel on the floor. One end of the rack gear 37 is secured to a piston rod of a double-acting pneumatic cylinder 40 that is supported above the floor by a stand 41. Thus, operation of the pneumatic cylinder 40 reciprocates the rack gear 37 to rotate the pinion gears 36 and the racks 28. The length of movement of the piston rod in the pneumatic cylinder 40 is such as to rotate the racks 28 through 180° revolutions. A timer 42 of any suitable type is mounted on the cylinder stand 41 for controlling operation of the pneumatic cylinder 40 and thereby determines the interval of time between reciprocation thereof.

A cooling table, generally designated by the numeral 43, projects from the front wall 18 just below the opening 33 and is supported from the floor by a plurality of legs 44. In alignment with each opening 33, a recessed opening 45 is provided in the table 43 and sized to receive a molding unit 29 as shown in FIG. 1. A blower 46 is provided for each recessed opening 45 and spaced below the table to generate cooling air and drive it upwardly through the funnel-shaped ducts 47 and the opening for cooling the molding units when they are removed from the oven.

Accordingly, a plurality of molding units may be placed in the oven 17 for molding and curing of hollow plastic articles at one time, and likewise the molding units may be arranged on the cooling table 43 at one time for cooling thereof prior to opening of the molds and removal of the hollow plastic articles. While only nine stations are illustrated in the apparatus as shown in FIG. 1, it can be appreciated that a greater or lesser number may be provided to accommodate the desires of the user.

Referring now particularly to FIGS. 3, 4 and 5, each molding unit 29 includes upper and lower mold supporting plates 48 and 49, generally rectangular in shape, which may support therebetween any number of molds desired. A plurality of molds 50 are carried by the mold supporting plates 48 and 49. The molds 50 are sectional and formed from halves which include an upper section 51 and a lower section 52 having internal surfaces shaped to define a substantially oval-shaped hollow article. The mating edges of the sections 51 and 52 are complementally grooved, as indicated at 53, FIG. 5, to guide the mating relation therebetween and provide a smooth inner wall surface for producing seamless hollow plastic articles.

The lower mold section 52 is supported on the lower plate 49 by a stem 54, which has a reduced portion 55 at its very end thereby defining an annular shoulder 56. The reduced portion 55 is received in a blind bore 57 provided in the lower plate 49, and the shoulder 56 bottoms against the upper surface of the plate 49 encircling the bore 57. A stud bolt 58 fixedly secures the stem 54 to the plate 49, whereby the lower mold section 52 is then fixedly mounted to the lower plate 49.

The upper mold section 51 is resiliently mounted to the upper mold supporting plate 48 by means of a stem 59 projecting from the upper end of the mold section and slidably received in a bore 60 extending through the upper plate. A coil spring 61 encircles the stem 59, and bottoms at one end on the top of the mold section 51 and at the other end on the under surface of the upper plate 48 to resiliently bias the mold section 51 downwardly and towards the lower mold section 52. A lock ring 62 is provided to be secured to the upper end of the stem 59 and on the upper side of the plate 48 in a recessed portion 63 to limit the downward movement of the stem 59 from the plate 48.

Runners 64 are provided along the opposite edges of the upper plate 48 on the upper side thereof, and runners 65 are provided along the opposite edges and on the lower side of the lower plate 49 in order to properly size the molding unit for fit into the rack 28. If larger molds are used than the molds 50, the size of the runners may be decreased in order to still properly fit within the racks 28. On the other hand, if the mold size is decreased from that shown, the runner size can be increased in order to fit in the racks 28. Thus, it may be appreciated that any size mold within certain limits may be utilized, and will be received within the racks 28 of the molding apparatus 17.

In order to lock the upper plate 48 with its mold sections 51 to the lower plate 49 with its mold sections 52, longitudinally extending grooves **65*a* are provided in the opposite edges of the upper plate 48, and longitudinally extending grooves 66 are provided in the opposite edges of the lower plate 49 to receive flanges 67 of locking plates 68 as seen in FIG. 3. The locking plates 68 are substantially channel-shaped and having the flanges 67 at the opposite edges extending substantially perpendicularly to the main portion and for engagement in the grooves of the upper and lower mold supporting plates. The distance between the flanges 67 is such that in order to engage them in the grooves of the mold supporting plates, it is necessary to first press the mold supporting plates together against the biasing of the springs 61, whereby when they are released, the flanges will frictionally lock with the grooves, and thereby resiliently hold the mold sections 51 and 52 together in proper mating position. Enlarged holes 69 are provided in the locking plates 68 in order to permit circulation of air through the molding unit and around the molds 50. When the molding units 29 are set on the cooling table 43, they are, in effect, set on edge whereby the circulation of air generated by the blowers 46 will enter through one of the locking plates 68 and be dispersed about the molds 50 and exit through the other locking plate and through the opposite ends of the molding unit. When placing the molding unit 29 into the racks 28 of the molding apparatus 17**, they will be placed right side up or with the upper and lower mold supporting plates extending horizontally.

A modified type of molding unit, generally designated by the numeral 29A, is shown in FIG. 6, which differs in the type of molds used and supported between the upper and lower mold supporting plates 48 and 49. In this embodiment, the molds which may be designated by the numeral 50A are not individually mounted to the supporting plates, but are joined together by webbing 70 to define an upper sheet 71 of cavities 72 and a lower sheet 73 of cavities 74, which mate together to define the molds for each of the hollow articles, as seen in FIG. 6. The lower sheet 73 of cavities is fixed to the lower mold supporting plate 49 by a plurality of stems 75 extending downwardly from some of the cavities, and stud bolts 76, in a manner similar to that of the embodiment in FIGS. 3 to 5. Similarly, stems 77 extend upwardly from some of the cavities 72 of the upper sheet 71 and are slidably received in bores 78 provided in the upper plate 48. Coil springs 79 are arranged between the upper plate and the mold cavities and locking rings 80 are provided to prevent the stems 77 from leaving the plate 48. Accordingly, the upper sheet 71 is resiliently mounted to the upper mold supporting plate 48. Therefore, the cavities 72 in the upper sheet 71 will mate with the cavities 74 in the lower sheet 73 when the upper and lower supporting plates 48 and 49 are placed together and the cavities will be biased toward each other in the same manner as in the embodiment of FIGS. 3 to 5.

The molding apparatus of the present invention is illustrated in FIGS. 1 and 2, wherein the racks 28 are supported on stationary bearings, and where there may be need for still increased production, the racks 28 may be mounted on an endless conveyor 81 as seen in FIG. 16 which carries the racks through an oven 82 and a cooling chamber 83. The endless conveyor 81 includes a chain mounted around spaced sprockets 84 and 85. The sprocket 85 constitutes the drive sprocket and is mounted on a drive shaft 86 having a sprocket 87 thereon in meshing engagement with an endless drive chain 88. A sprocket 89 is also in meshing engagement with the chain 88 and is mounted on an output shaft of a combination motor reduction gear assembly 90. Thus, the endless conveyor 81 is driven by the motor reduction gear assembly 90. The oven 82 and the cooling chamber 83 are arranged to enclose the intermediate portions of the upper run of the conveyor and sized so that the racks 28 may be drawn therethrough. Suitable heating means may be provided in the oven 82 in order to engulf the molding units and racks in a heating media, and a blower 91 may be provided on the top of the cooling chamber 83 for forcing circulated cool air or room temperature air through the molding units. At the discharge end of the conveyor, the molding units 29 may be removed from the racks 28 and placed on a table 92 where the molds may be disassembled and the completed hollow articles removed therefrom. Then the molds may be reassembled and reinserted in the rack and carried around to the inlet end of the oven 82 whereupon the molding units may be removed and placed upon a filling table 93 to be filled by a filling unit 94 and reassembled and reinserted into the racks 28 prior to the racks being advanced into the oven 82. It may be appreciated that the refilling process may take place also at the discharge end of the conveyor after the hollow plastic articles have been unloaded from the molding units. This embodiment merely illustrates that the racks 28 might be utilized in connection with an endless conveyor in order to further mass produce the hollow plastic articles. It should be appreciated that the racks are rotatably mounted on the conveyor, and any suitable means may be provided to rotate the racks through 180° revolutions during the molding process.

The method of molding the hollow plastic articles is somewhat illustrated in the FIGS. 7 to 15 which illustrate the steps of operation after the plastic has been injected into the molds. A predetermined quantity of liquid plastic, such as a vinyl resin, is first injected into the lower half of the mold. The mold is then closed by placing the upper half of the mold in mating relationship with the lower half, as shown diagrammatically in FIG. 7. Then the mold is subjected to heat as by insertion into the oven 17 in order to raise the temperature of the thermosetting plastic and commence the curing process. The mold is then rotated through 180° revolutions at a speed which will centrifugally hold the liquid plastic in the lower half of the mold until it reaches the upper dwell position. As seen in FIG. 8, the position of the plastic at the instant the rotation has been concluded will be in the lower half of the mold, which is now in the upper position. The mold is then held stationary for a predetermined time in this position, during which time the liquid runs down the inner surfaces of the mold and to the upper half 51 of the mold which is now in the lower position. FIG. 9 illustrates how the plastic commenced flowing down the inner surface of the mold, and FIG. 10 illustrates approximately the extent of flow of the plastic prior to the time that the mold is again subjected to a 180° revolution to the position shown in FIG. 11. Once again, the majority of the plastic will flow to the then lower half of the mold, as seen in FIGS. 12 and 13, until it is time to again rotate the mold through a 180° revolution. FIG. 14 is illustrative of the again upside down condition of the mold, while FIG. 15 shows still another rotated position and approximately how the completed article, which may be designated by the numeral 95, has been formed within the mold. Of course, it will be appreciated that it will require a considerable number of revolutions in order to completely cure the plastic within the mold. It has been found that a six-second interval is sufficient to allow between rotation of the molds for a common vinyl resin plastic.

The thermo-setting plastic is initially injected into the mold at room temperature and commences curing when it reaches a certain temperature. For example, it may be necessary to heat the plastic to a temperature between 350° F. and 700° F. in order for it to properly set and cure. Further, after the plastic has properly cured, the molds are removed from the oven 17 and properly cooled to a temperature of approximately 250° F. on the cooling table 43. Plastic should be cooled to a temperature so that it will not stretch and deform when removing the hollow plastic articles from the molds.

The number of cycles through which the mold will be rotated depends upon the type of thermo-setting plastic used and its curing temperature, the wall thickness of the object being molded, and the wall thickness of the mold. Also, the dwell time between rotations of the mold may vary, although six seconds has been found to be most favorable. It has been found that some vinyl resins properly cure after fifteen minutes of operation in an oven.

It will be understood that modifications and variations may be effected without departing from the scope of the novel concepts of the present invention, but it is understood that this application is to be limited only by the scope of the appended claims.

The invention is hereby claimed as follows:

1. In the method of centrifugal rotational molding of a hollow article from a thermo-setting plastic, the steps of introducing a measured amount of liquid thermo-setting plastic into a mold, heating the mold to a temperature capable of curing the plastic, quickly rotating the mold about a horizontal axis during heating thereof through 180° revolutions at a speed such that substantially all of the plastic in the liquid state will by centrifugal force remain substantially stationary during each rotational movement of the mold, maintaining the mold quiescent for a period of time between said revolutions sufficient to permit substantially all of the plastic in a fluid state to run to the bottom of the mold, and repeating said rotation and quiescent steps until all of the plastic is cured on the walls of the mold.

2. In a method of centrifugal rotational molding of a hollow article from a thermo-setting plastic, the steps of introducing into a mold a charge of liquid thermo-setting plastic having a volume less than the mold, closing the mold, quickly rotating the mold about a horizontal axis through 180° revolutions at a speed such that the plastic in the liquid state will by centrifugal force remain substantially stationary during each rotational movement of the mold, maintaining the mold quiescent for a period of time between said revolutions sufficient to permit substantially all of the plastic in a fluid state to run to the bottom of the mold, repeating said rotation and quiescent steps until all of the plastic is cured on the walls of the mold, and heating the mold to a temperature capable of curing the plastic during the rotation thereof.

3. In a method of centrifugal rotational molding of a hollow article from a thermo-setting plastic, the steps of introducing into a mold a charge of liquid thermo-setting plastic having a volume less than the mold, closing the mold, quickly rotating the mold about a horizontal axis through 180° revolutions at a speed such that the plastic in the liquid state will by centrifugal force remain substantially stationary during each rotational movement of the mold, maintaining the mold quiescent for a period of time between said revolutions sufficient to permit substantially all of the plastic in a fluid state to run to the bottom of the mold, heating the mold to a temperature capable of curing the plastic during the rotation thereof, repeating said rotation and quiescent steps until all of the plastic is cured on the walls of the mold, and cooling the mold to a temperature substantially below the curing temperature before removing the molded article.

4. In a method of centrifugal rotational molding of a hollow article from a thermo-setting plastic in a closed mold including two separating parts, the steps of introducing a charge of liquid thremo-setting plastic into one of the mold parts, joining the mold parts thereby closing the mold, quickly rotating the mold about a horizontal axis through 180° revolutions at a speed such that substantially all of the plastic in the liquid state will be maintained in one of the mold parts during each rotational movement of the mold, maintaining the mold quiescent for a period of time between said revolutions to permit substantially all of the plastic in a liquid state to run to the bottommost mold part, repeating said rotation and quiescent steps until all of the plastic is cured on the walls of the mold, and heating the mold to a temperature capable of curing the plastic during rotation thereof and thereby forming a hollow article.

5. In a method of centrifugal rotational molding of a hollow article from a thermo-setting plastic in a closed mold including two separating parts, the steps of introducing a charge of liquid thermo-setting plastic into one of the mold parts, joining the mold parts thereby closing the mold, quickly rotating the mold about a horizontal axis through 180° revolutions at a speed such that substantially all of the plastic in the liquid state will be maintained in one of the mold parts during each rotational movement of the mold, maintaining the mold quiescent for a period of time between said revolutions to permit substantially all of the plastic in a liquid state to run to the bottommost mold part, repeating said rotation and quiescent steps until all of the plastic is cured on the walls of the mold and heating the mold to a temperature capable of curing the plastic during rotation thereof and thereby forming a hollow article, cooling the mold to a temperature substantially below the curing temperature, separating the mold parts thereby opening the mold, and removing the molded article from the mold.

References Cited in the file of this patent

UNITED STATES PATENTS

| | | |
|---|---|---|
| 1,659,399 | Faber | Feb. 14, 1928 |
| 2,221,695 | Robertson | Nov. 12, 1940 |
| 2,298,057 | Kelm | Oct. 6, 1942 |
| 2,418,852 | Rothstein | Apr. 15, 1947 |
| 2,696,642 | Kohrn | Dec. 14, 1954 |
| 2,730,766 | Tomkins | Jan. 17, 1956 |
| 2,864,128 | Heisler et al. | Dec. 16, 1958 |
| 2,888,714 | Bray | June 2, 1959 |
| 2,918,703 | Beal | Dec. 29, 1959 |
| 2,921,340 | Bunford | Jan. 19, 1960 |
| 2,946,092 | Yoder | July 26, 1960 |

FOREIGN PATENTS

| | | |
|---|---|---|
| 711,510 | Great Britain | July 7, 1954 |

UNITED STATES PATENT OFFICE

CERTIFICATE OF CORRECTION

Patent No. 3,048,896 August 14, 1962

Arvid Marlo

It is hereby certified that error appears in the above numbered patent requiring correction and that the said Letters Patent should read as corrected below.

Column 1, line 60, for "for" read -- of --; column 2, line 31, for "provided" read -- to provide --; line 38, for "opening" read -- open --.

Signed and sealed this 11th day of December 1962.

(SEAL)
Attest:

ERNEST W. SWIDER
Attesting Officer

DAVID L. LADD
Commissioner of Patents